(12) United States Patent
Fukuyama et al.

(10) Patent No.: US 6,442,016 B2
(45) Date of Patent: Aug. 27, 2002

(54) SOLID-STATE ELECTROLYTIC CAPACITOR

(75) Inventors: Sachiko Fukuyama; Hirotoshi Hirakawa; Shuetsu Iwanabe, all of Saga (JP)

(73) Assignees: Sanyo Electric Co., Ltd., Osaka (JP); Saga Sanyo Industries Co., Ltd., Saga (JP)

( * ) Notice: Subject to any disclaimer, the term of this patent is extended or adjusted under 35 U.S.C. 154(b) by 0 days.

(21) Appl. No.: 09/799,095

(22) Filed: Mar. 6, 2001

(30) Foreign Application Priority Data

Mar. 7, 2000 (JP) .................................... 2000-061378
Mar. 14, 2000 (JP) .................................... 2000-070200

(51) Int. Cl.$^7$ ................................................ H01G 9/08
(52) U.S. Cl. ...................................... 361/523; 361/525
(58) Field of Search ............................... 361/523–540, 361/503

(56) References Cited

U.S. PATENT DOCUMENTS 4,591,951 A * 5/1986 Iwamoto et al. ......... 174/138 G
5,117,333 A * 5/1992 Kakuma et al. ........... 29/25.03
6,052,273 A * 4/2000 Inoue et al. ................. 361/523
6,219,224 B1 * 4/2001 Honda ......................... 361/518

FOREIGN PATENT DOCUMENTS

JP          11-204377          7/1999

* cited by examiner

*Primary Examiner*—Dean A. Reichard
*Assistant Examiner*—Eric W. Thomas
(74) *Attorney, Agent, or Firm*—Armstrong, Westerman & Hattori, LLP

(57) ABSTRACT

In a solid-state electrolytic capacitor in which a capacitor element having an anode member with a dielectric film formed thereon is impregnated with conductive polymer serving as a cathode electrolyte and housed/sealed within an outer case, the capacitor element impregnated with conductive polymer is covered with epoxy resin mixed with a silane coupling element. Otherwise, the capacitor element impregnated with conductive polymer is covered with a first resin layer and a second resin layer which are formed successively on an outside thereof, and the first resin layer is made of a material having higher flexibility than that of the second resin layer.

6 Claims, 4 Drawing Sheets

SOLID-STATE ELECTROLYTIC CAPACITOR

BACKGROUND OF THE INVENTION

1. Field of the Invention

This invention relates to a solid-state electrolytic capacitor in which a capacitor element having an anode member with a dielectric film formed thereon is impregnated with conductive polymer serving as a cathode electrolyte and housed/sealed within an outer case.

2. Description of the Related Art

A previously known structure of a solid-state electrolytic capacitor is shown in FIG. 4, in which a capacitor element having an anode member with a dielectric film formed thereon is impregnated with conductive polymer serving as a cathode electrolyte and housed/sealed within an outer case.

In this solid-state electrolytic capacitor, a capacitor element 11 is manufactured in a manner that an anode foil with a dielectric film formed thereon and an opposite cathode foil are wound with a separator interposed therebetween. The capacitor element 11 is impregnated with conductive polymer serving as a cathode electrolyte. The capacitor element 11 is housed within a cylindrical bottomed outer case 15 and sealed by sealing rubber 16. A seat plate 18 for surface mounting is mounted on the sealed end of the outer case 15. In FIG. 4, reference numerals 17a and 17b denote terminals for extending the anode and the cathode, respectively.

Conventionally, in such a solid-state electrolytic capacitor, the following thing occurred. The conductive polymer impregnated in the capacitor element absorbs moisture during a manufacturing process after the conductive polymer has been formed. As a result, in a solder heat resistant test or endurance test executed for the completed product of the capacitor, the equivalent series resistance and the lead current increase.

JP-A-11-204377 discloses a technique that in such a solid-state electrolytic capacitor, in order to suppress gas generation from conductive polymer due to a solder heat resistance test, thereby preventing a case or sealing member from swelling, the outside of the capacitor element impregnated with conductive polymer is covered with epoxy resin.

However, the solid-state capacitor with an epoxy resin layer formed outside the capacitor element impregnated with conductive polymer according to the technique disclosed in JP-A-11-204377 has the following defect. Specifically, in the solder heat resistance test, as the case may be, mechanical stress is applied to the interior of the capacitor element owing to a difference in a thermal expansion coefficient between the members of the capacitor including conductive polymer and the epoxy resin layer so that the dielectric film on the anode member is damaged. As a result, the leakage current is increased very greatly.

SUMMARY OF THE INVENTION

An object of this invention is to provide a solid-state electrolytic capacitor including conductive polymer as a cathode electrolyte which is free from attenuation of the characteristic such as an increase in a leakage current.

In order to attain the above object, in accordance with the first aspect of this invention, there is provided a solid-state electrolytic capacitor in which a capacitor element having an anode member with a dielectric film formed thereon is impregnated with conductive polymer serving as a cathode electrolyte and housed/sealed within an outer case, wherein the capacitor element impregnated with conductive polymer is covered with epoxy resin mixed with a silane coupling element.

In accordance with this invention, after the conductive polymer has been formed, moisture absorption by this polymer is suppressed. Thus, during the solder heat resistant test and endurance test executed the product of the capacitor, the equivalent series resistance and leakage current are made difficult to vary.

In accordance with the second aspect of this invention, there is provided a solid-state electrolytic capacitor in which a capacitor element having an anode member with a dielectric film formed thereon is impregnated with conductive polymer serving as a cathode electrolyte and housed/sealed within an outer case, wherein the capacitor element impregnated with conductive polymer is covered with a first resin layer and a second resin layer which are formed successively on an outside thereof, and the first resin layer is made of a material having higher flexibility than that of the second resin layer.

In this configuration, since the capacitor element is covered with the first resin layer made of higher flexibility in intimate contact with the outside thereof, mechanical stress is difficult to spread to the interior of the capacitor so that the dielectric film within the capacitor element is difficult to be damaged.

Since the first resin layer is made of such a material, freedom of selecting the material of the second resin layer can be enhanced.

In this configuration of the solid-state electrolytic capacitor, it is possible to prevent the case or sealing member from being swelled during a solder heat resistance test, and to suppress an increase in the leakage current.

The above and other objects and features of this invention will be more apparent from the following description taken in conjunction with the accompanying drawings.

DESCRIPTION OF THE PREFERRED EMBODIMENTS

Figure 1:
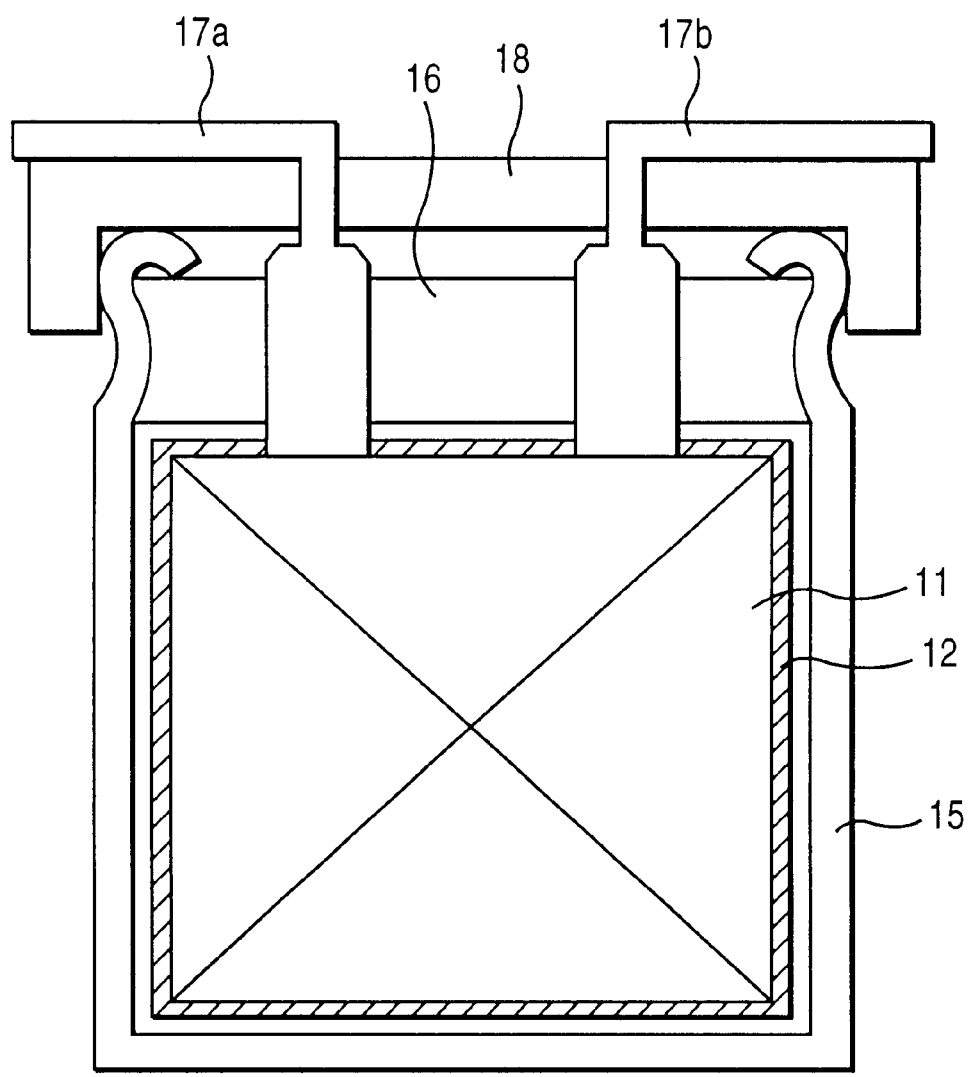
FIG. 1 is a sectional view of a solid-state electrolytic capacitor according to a first embodiment of this invention.

Now referring to the drawings, an explanation will be given of embodiments of this invention.

Embodiment 1

The solid-state electrolytic capacitor according to a first embodiment of this invention is shown in FIG. 1. As seen from FIG. 1, a winding type capacitor element 11 with conductive polymer formed therein is coated with epoxy resin 12 mixed with silane coupling agent. Thereafter, the capacitor element is housed within an outer case 15 of aluminum and sealed with sealing member 16 of rubber. A seat plate 18 for surface mounting is mounted on the sealed end of the outer case.

The winding type capacitor element is wounded in a cylindrical shape with an anode of an aluminum foil subjected to an etching treatment and anodic oxidation treatment and an opposite cathode with a separator interposed therebetween.

In order to form a conductive polymer layer within the winding type capacitor element, prepared are monomer of 3,4-ethylene dioxythiophene which becomes conductive polymer by oxidation/polymerization, iron (III) para-toluene sulfonic acid serving as an oxidizing agent and a chemical polymerizing liquid containing n-butyl alcohol which is diluent. The capacitor element is immersed in the chemical polymerizing liquid and thereafter heat-treated for several minutes at about 200° C. so that a polymer layer of 3,4-ethylene dioxythiophene in intimate contact with an anode-formed foil and an opposite cathode foil within the capacitor is formed.

A coating layer of epoxy resin mixed with silane coupling agent is created in such a manner that the capacitor element with the conductive polymer layer formed is immersed in a solution consisting of silane coupling agent and epoxy resin mixed at a ratio of about 1:1 by weight, and taken out and dried. The silane coupling agent may be 3-glysidoxypropyltrimethoxy silane (chemical fomula:$CH_2$(O) $CH_2C_3O_3H_6Si$ $(OCH_3)_3$. The mixing ratio of silane coupling agent and epoxy resin should not be limited to about 1:1, but may be suitably selected within a range of e.g. about 0.001~1000:1.

The capacitor element with the coating layer thus formed is housed within a cylindrical bottomed outer case 15 made of aluminum in a state where a sealing rubber 16 is mounted on the root of the terminals 17a and 18a for extending the anode and cathode, respectively. The capacitor element is subjected in its opening portion to lateral reduction and curling and thereafter to the aging for several tens or several hours while a rated voltage is applied. Thus, a product of the capacitor can be completed.

Figure 2:
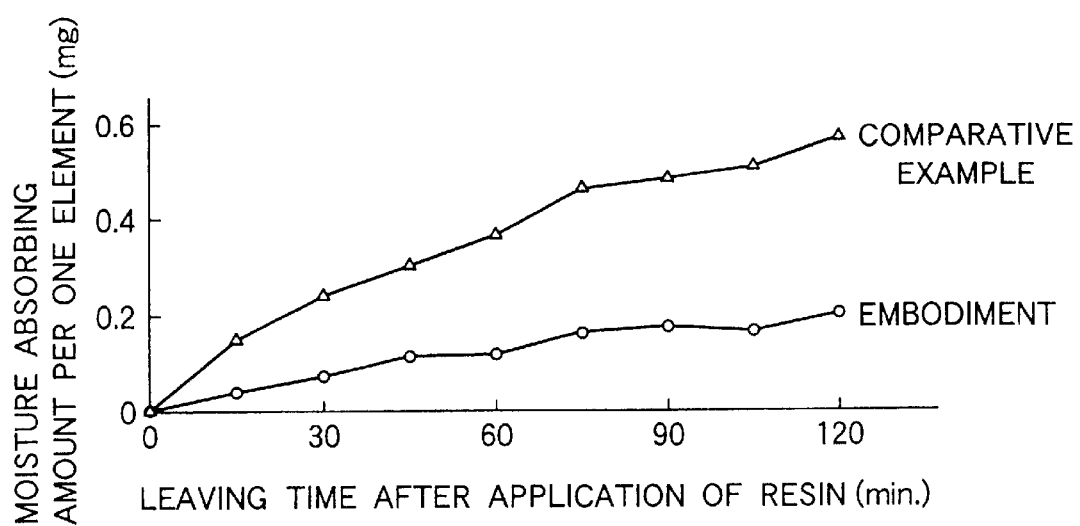
FIG. 2 is a graph showing the experimental result of the hygroscopic property (moisture absorption property) according to the embodiment of this invention and a comparative example.

In comparison between the capacitor element with the conductive polymer and coating layer formed in accordance with the embodiment of this invention (embodiment 1) and the capacitor element with no coating layer (comparative example 1), FIG. 2 shows the changes in the moisture per one element when these elements are left in an air at a temperature of 25° C. and moisture of 70%.

Further, in comparison between the solid-state electrolytic capacitor including the capacitor element with the conductive polymer and coating layer formed according to the embodiment of this invention (embodiment 1) and the solid-state electrolytic capacitor including the capacitor element with no coating layer (comparative example 1), Table 1 shows the results when they have been subjected to the solder heat resistance test according to VPS (Vaper Phase Soldering) method (240° C.×40 sec×twice) and the subsequent endurance test (105° C.×500 hours under the application of a rated voltage).

TABLE 1

|  | Before Test | | After VPS Test | | | After Endurance Test | | |
| --- | --- | --- | --- | --- | --- | --- | --- | --- |
|  | ESR (mΩ) | LC (μA) | ΔC/C (%) | ESR (mΩ) | LC (μA) | ΔC/C (%) | ESR (mΩ) | LC (μA) |
| Embodiment 1 | 46.1 | 63.3 | −0.53 | 46.5 | 42.1 | −1.04 | 46.9 | 0.95 |
| Comp. Exa. 1 | 46.1 | 60.6 | −0.64 | 58.3 | 1125 | −1.34 | 73.6 | 263 |

The capacitor elements according to this embodiment 1 and comparative example 1 have ratings of 16V–27 μF and outer dimensions of φ6.3 mm×L5.8 mm. In Table 1, ΔC/C denotes a changing rate of the electrostatic capacitance at 120 Hz; ESR denotes an equivalent series resistance at 100 kHz; and LC denote a leakage current after 60 sec from when a rated voltage has been applied. Incidentally, each of these characteristics is an average value of 20 samples.

As apparent from FIG. 2, the capacitor element according to the embodiment of this invention is more difficult to absorb moisture than the capacitor element according to the comparative example is. Further, as apparent from Table 1, the capacitor element according to the embodiment of this invention has less change in the characteristics by the VPS test and endurance test than the capacitor element according to the comparative example has.

In this embodiment, although the polymer of 3,4-ethylene dioxythiophene was used as the material of the cathode electrolyte, other conductive polymers (e.g. oxidized/polymerized polymer of pyrrole, thiophene, aniline or their derivative) may be used.

Further, in this embodiment, a winding type capacitor element was used, a capacitor element with an anode member made of a sintered tantalum body coated with a dielectric film may be used.

Embodiment 2

Figure 3:
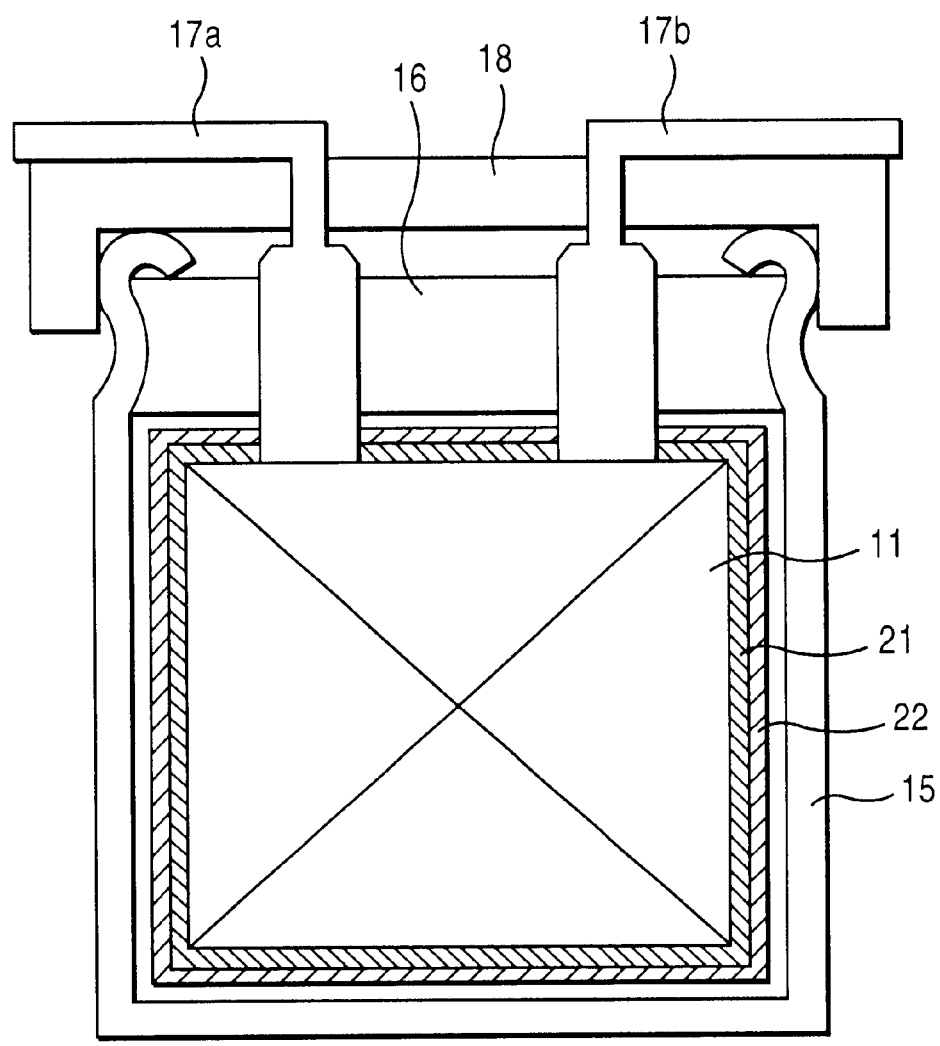
FIG. 3 is a sectional view of a solid-state electrolytic capacitor according to a second embodiment of this invention.
Figure 4:
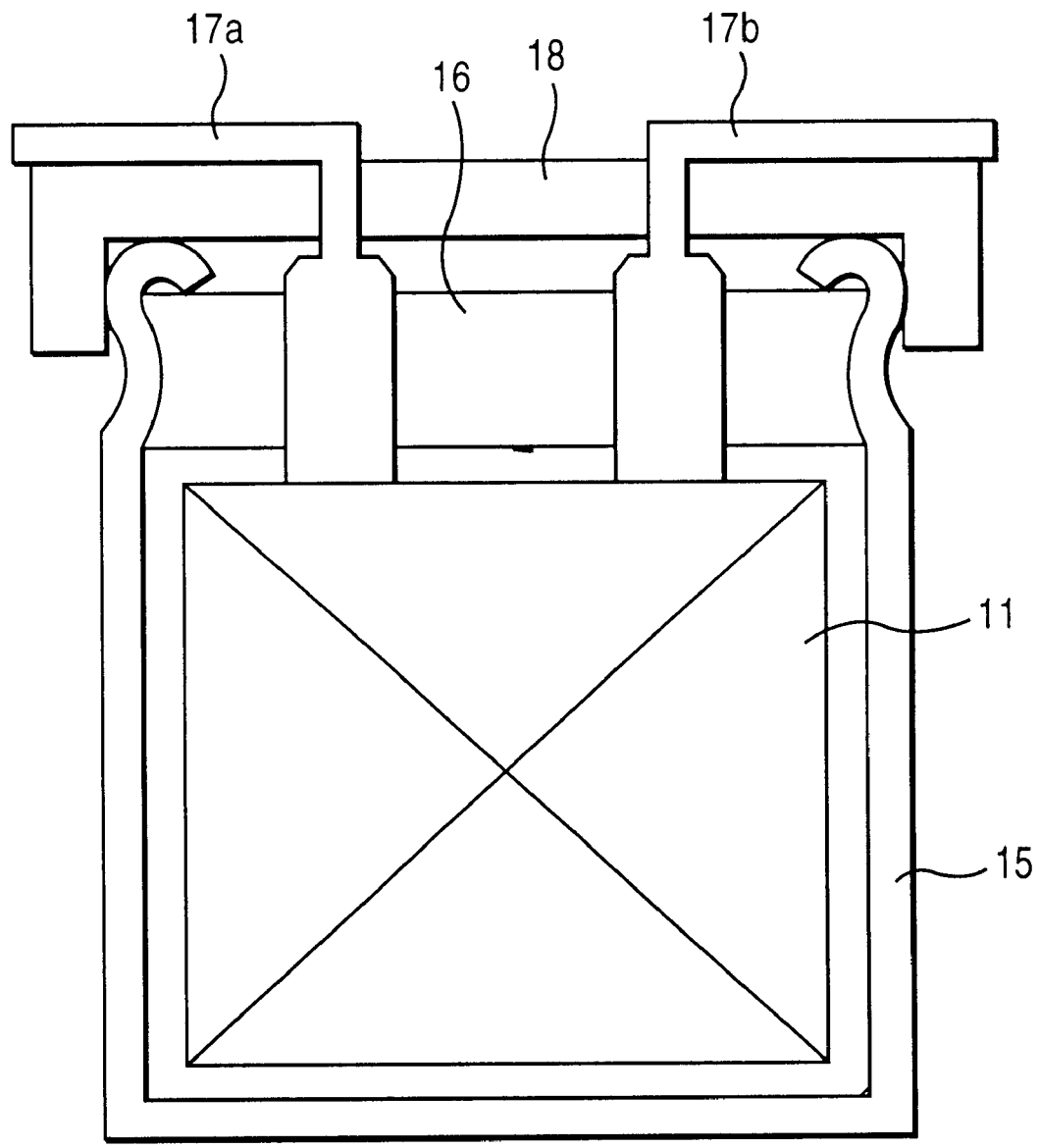
FIG. 4 is a sectional view of a solid-state electrolytic capacitor according to a conventional art.

The solid-state electrolytic capacitor according to a second embodiment of this invention is shown in FIG. 3.

As seen from FIG. 3, a winding type capacitor element 11 with conductive polymer formed therein is coated, in its outside, with a first resin layer 21 having high flexibility and further with a second resin layer 22 having high hermeticity. Thereafter, the capacitor element is housed within an outer case 15 of aluminum and sealed with sealing member 16 of rubber. A seat plate 18 for surface mounting is mounted on the sealed end of the outer case.

The winding type capacitor element is wounded in a cylindrical shape with an anode of an aluminum foil subjected to an etching treatment and anodic oxidation treatment and an opposite cathode with a separator interposed therebetween.

In order to form a conductive polymer layer within the winding type capacitor element, prepared are monomer of 3,4-ethylene dioxythiophene which becomes by oxidation/polymerization, iron (III) para-toluene sulfonic acid serving as an oxidizing agent and a chemical polymerizing liquid containing n-butyl alcohol which is diluent. The capacitor element is immersed in the chemical polymerizing liquid and thereafter heat-treated for several minutes at about 200° C. so that a polymer layer of 3,4-ethylene dioxythiophene in intimate contact with an anode formed foil and an opposite cathode foil within the capacitor is formed.

The first resin layer is preferably made of thermosetting resin (e.g. epoxy resin) which has higher flexibility than that of the second resin layer. On the other hand, the second resin layer is preferably made of thermosetting resin (e.g. acid anhydride epoxy resin) which has higher hermeticity than that of the first resin layer. The flexibility of the resin can be quantified in terms of numeric values of Rockwell hardness, tensile strength, elongation coefficient after fracture, etc. The first resin layer preferably has the Rockwell hardness of 100 or less in M scale, tensile strength of 5 kg weight/mm$^2$ or more, and tension extension coefficient of 4% or more.

Further, the first resin layer preferably has adherence to the outer surface of the capacitor element covered with conductive polymer, and surface resistivity of $10^{13}$ Ω or more. The capacitor element thus coated with the first and the second resin layer is housed within a cylindrical bottomed outer case 15 made of aluminum in a state where a sealing rubber 16 is mounted on the root of the terminals 17a and 18a for extending the anode and cathode, respectively. The capacitor element is subjected in its opening portion to barring and curling and thereafter to the aging for several tens or several hours while a rated voltage is applied. Thus, a product of the capacitor can be completed.

The inventors of this invention manufactured the solid-state electrolytic capacitor having the first and the second resin layer according to the embodiment of this invention (embodiment 2) and the solid-state electrolytic capacitor having a single layer of the same material as that of the above second resin layer (comparative example 2). These solid-state electrolytic capacitors were subjected to the solder heat-resisting test (240° C.×90 sec×twice) by the VPS technique.

Table 2 shows the characteristics of these solid-state electrolytic capacitors before the solder heat-resisting test. Table 3 shows changes in the leakage current of these solid-state electrolytic capacitors before and after the solder heat-resisting test.

TABLE 2

|  | C ($\mu$F) | tan δ (%) | ESR (mΩ) | LC yield (%) |
|---|---|---|---|---|
| Embodiment 2 | 221 | 10 | 49 | 92 |
| Comp. Exa. 2 | 222 | 10 | 50 | 84 |

TABLE 3

|  | LC before Solder Heat-Resisting Test ($\mu$A) | | LC after Solder Heat-Resisting Test ($\mu$A) | |
|---|---|---|---|---|
|  | Minimum | Maximum | Minimum | Maximum |
| Embodiment 2 | 1 | 39 | 10 | 100 |
| Comp. Ex. 2 | 6 | 26 | 410 | 1310 |

The capacitor elements according to this embodiment and comparative example have ratings of 20V–22 $\mu$F and outer dimensions of $\phi$ 6.3 mm×L6.0 mm. In Table 2, C denotes an electrostatic capacitance at 120 Hz; tan δ denotes tangent of the loss angle at 120 Hz; and ESR denotes an equivalent series resistance at 100 kHz. Incidentally, each of these characteristics is an average value of 50 samples.

The LC yield in Table 2 shows the ratio of the number of good products to that of samples (50 pieces for each) where the good product means that the leakage current after 60 sec from when a rate voltage has been applied is not larger than 88 $\mu$A.

Table 3 shows a minimum value and a maximum value of the leakage current (LC) before and after 60 sec from when a rate voltage has been applied for the 50 samples according to this embodiment and the comparative example.

As apparent from Table 2, the capacitor element according to the embodiment of this invention has approximately equal initial characteristics to those of the capacitor element according to the comparative example. Further, as apparent from Table 3, in the capacitor element according to the embodiment of this invention, an increase in the leakage current by the solder heat-resisting test is suppressed more greatly than in the capacitor element according to the comparative example.

In this embodiment, although the polymer of 3,4-ethylene dioxythiophene was used as the material of the cathode electrolyte, other conductive polymers (e.g. oxidized/polymerized polymer of pyrrole, thiophene, aniline or their derivative) may be used.

Further, in this embodiment, a winding type capacitor element was used, a capacitor element with an anode member made of a sintered tantalum body coated with a dielectric film may be used.

What is claimed is:

1. A solid-state electrolytic capacitor comprising:

a capacitor element having an anode member;

a dielectric film formed on said anode member;

said capacitor element being impregnated with conductive polymer serving as a cathode electrolyte;

an epoxy resin mixed with a silane coupling element, which covers said capacitor element impregnated with conductive polymer; and an outer case for having and sealing said capacitor element.

2. A solid-state electrolytic capacitor according to claim 1, wherein said anode member is an anode foil and wherein said capacitor element has an opposite cathode foil;

said anode foil and said cathode foil being wound with a separator interposed therebetween.

3. A solid-state electrolytic capacitor according to claim 1, wherein said conductive polymer is oxidized/polymerized polymer of thiophene or its derivative.

4. A solid-state electrolytic capacitor comprising:

a capacitor element having an anode member;

a dielectric film formed on said anode member;

said capacitor element being impregnated with conductive polymer serving as a cathode electrolyte;

a first resin layer and a second resin layer which are formed successively on an outside of said capacitor element impregnated with conductive polymer, and the first resin layer is made of a material having higher flexibility than that of said second resin layer; and an outer case for housing and sealing said capacitor element.

5. A solid-state electrolytic capacitor according to claim 4, wherein said anode member is an anode foil and wherein said capacitor element has an opposite cathode foil;

said anode foil and said cathode foil being wound with a separator interposed therebetween.

6. A solid-state electrolytic capacitor according to claim 4, wherein said conductive polymer is oxidized/polymerized polymer of thiophene or its derivative.

* * * * *